United States Patent [19]

Little et al.

[11] Patent Number: 4,458,540
[45] Date of Patent: Jul. 10, 1984

[54] REMOTE DISPLAY MODULE FOR DISPLAYING CHARACTERISTICS OF FLOWING SLURRY

[75] Inventors: Charles D. Little, Graceland Park; Keith W. Lipford, Pasadena, both of Md.

[73] Assignee: Ellicott Machine Corporation, Baltimore, Md.

[21] Appl. No.: 412,010

[22] Filed: Aug. 27, 1982

[51] Int. Cl.³ .............................................. G01F 1/76
[52] U.S. Cl. .................................... 73/861.01; 73/198; 340/754
[58] Field of Search .......... 73/861.01, 861.02, 861.03, 73/861.04, 198; 340/715, 721, 722, 754, 782

[56] References Cited

U.S. PATENT DOCUMENTS

| | | | |
|---|---|---|---|
| 2,959,459 | 11/1960 | Ryan | 346/7 |
| 3,599,033 | 8/1971 | Stettiner | 340/721 X |
| 3,926,050 | 12/1975 | Turner et al. | 73/861.04 |
| 4,210,908 | 7/1980 | Sakakibara | 340/715 |
| 4,261,196 | 4/1981 | Scheid, Jr. | 73/861.04 |

Primary Examiner—Herbert Goldstein
Attorney, Agent, or Firm—Scrivener, Clarke, Scrivener and Johnson

[57] ABSTRACT

A remote display module displays characteristics, e.g. specific gravity and velocity, of a slurry of solids and liquid flowing in a pipeline. The remote display module generates a light spot representative of the coordinates of velocity and specific gravity signals which an operator endeavors to maintain in desired position relative to graphical overlays representative of the weight of solids flow per unit of time for a pipeline of known diameter.

8 Claims, 4 Drawing Figures

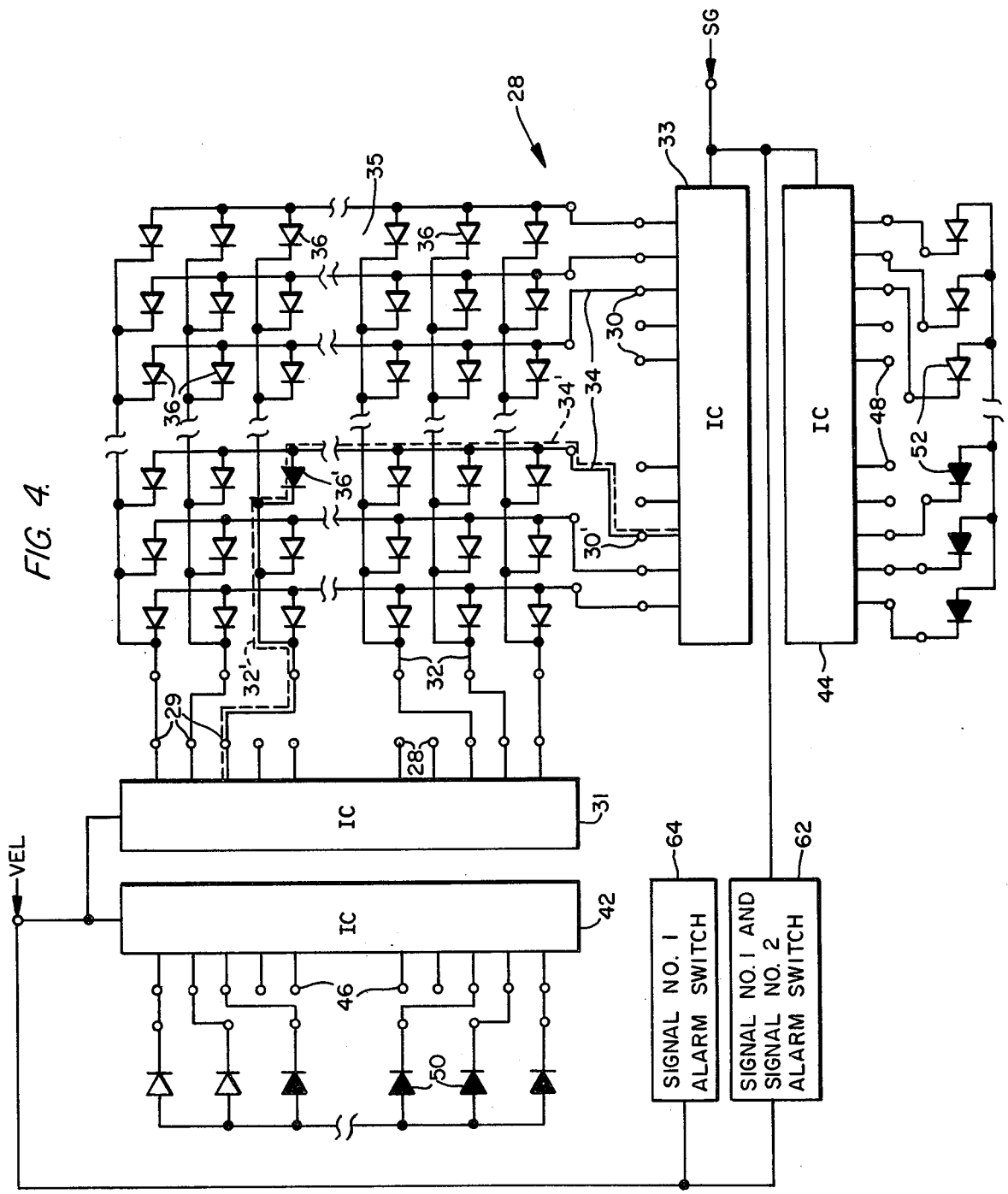

REMOTE DISPLAY MODULE FOR DISPLAYING CHARACTERISTICS OF FLOWING SLURRY

This invention relates to devices for displaying characteristics of a slurry flowing in a pipeline and more particularly to a remote display module for continuously displaying the correlation between the specific gravity of slurry and its velocity to provide an indication of the production rate of solids in the slurry as units of weight per unit of time.

Though it will be apparent that the present invention is susceptible of use in conjunction with any type of slurry composed of a liquid and solids e.g. pulp, coal, etc., flowing in a pipeline the invention will be primarily described as it relates to dredged spoil flowing in a pipeline.

In the field of dredging there has been a long felt need for supplying an operator with instantaneous information as to existing conditions of the dredged spoil in order that the operator can make suitable adjustments to ensure continuous optimum operation. In the early days of dredging, the operator relied almost exclusively on a vacuum gauge to give him an indication of the efficiency of his rate of excavation. An improvement on the vacuum gauge was a specific gravity indicator wherein any reading in excess of 1 was a measure of the solids being excavated. The next improvement was a so-called production meter which added a factor of the velocity of fluid flow. The production meter not only gave indications of specific gravity and velocity but these factors could be integrated to give a rate of production in tons per hour, say, and also total production; that is to say, the total weight of solids actually excavated and delivered to a remote area. By observing the velocity and specific gravity figures which appeared digitally in windows of the meter, it was thought that the dredge operator would have all the information he required to operate the dredge in the most efficient manner. It was found, however, that it was difficult for the operator to watch continuously the figures appearing in the window of the meter and even more difficult for the operator to mentally coordinate the entirely separate velocity and specific gravity figures in order to operate the dredge in the most efficient manner.

The broad object of the present invention is to provide a display module, which may be located remotely from any other recording or indicating means monitoring slurry flowing in a pipeline, to give an instantaneous coordinate indication of the velocity of slurry flow relative to the specific gravity of the flow.

More particularly it is an object of the invention to provide a remote display module of the foregoing nature wherein the coordinate indication is a spot of light which is disposed on a display face in a position representative of the instantaneous coordinated effect of the velocity relative to the specific gravity of the slurry flowing in the pipeline.

Still another object of the invention is to provide adjacent to the sides of the display face bar lights which are each lit along a length corresponding to the ordinate and abscissa position of the light spot, one of said ordinate and abscissa being representative of the value of specific gravity and the other of said ordinate and abscissa being representative of the value of velocity the light spot being at the point of intersection of the ordinate and abscissa lines corresponding to the ends of the bar lights.

Still another object of the invention is to provide changeable overlays or the like which may be applied to the display face and which may bear indicia of which portions may be illuminated by the above mentioned light spot to convey information to the operator such as the tons per hour, cubic yards per hour, etc. of solids or slurry flowing in any pipe line of known diameter.

Other objects and their attendant advantages will become apparent as the following description is read in conjunction with the accompanying drawings wherein:

FIG. 4 is a circuit diagram which may be utilized for generating the light spot on the display face and also the bar lights at the sides of the display face.

Figure 1:
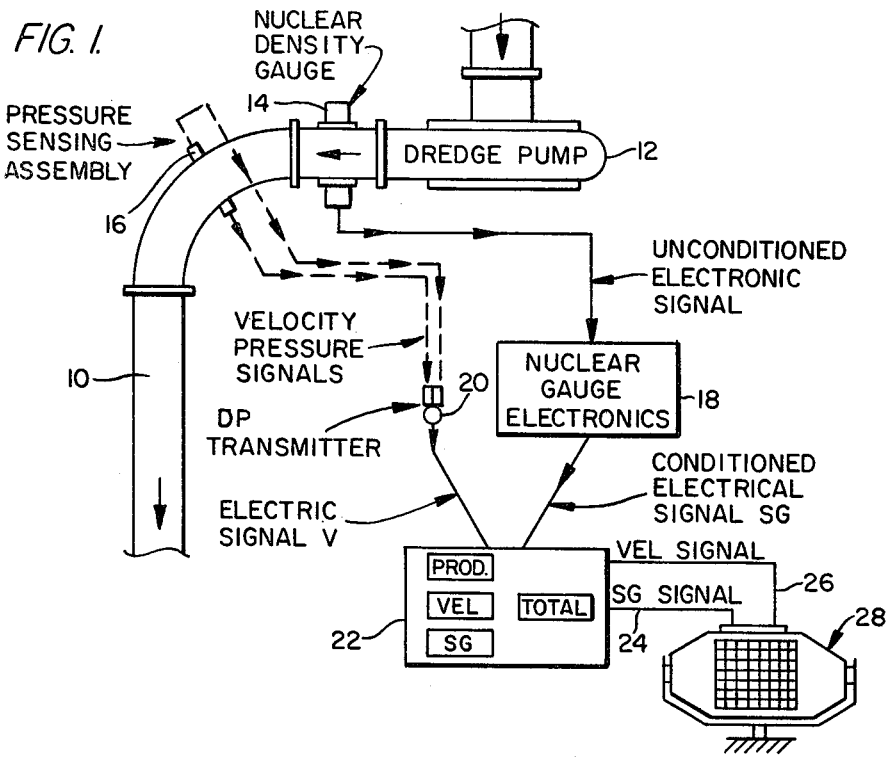
FIG. 1 is a schematic view of a system for deriving velocity and specific gravity values of a slurry flowing in a pipeline.

Referring now to the drawings and particularly FIG. 1, 10 designates a pipe line which receives from a pump 12, which may be a dredge pump, a slurry composed of a mixture of liquid and solids. A density or specific gravity signal may be derived from a known nuclear density gauge 14, or from taps in a U-bend in a known manner as described and claimed in the prior U.S. Pat. of Turner et al. No. 3,926,050 assigned to the same assignee as the present application, or other means. In addition, a velocity signal may be derived by a known elbow meter 16 more particularly described in the aforementioned patent to Turner et al. or other means. The specific gravity and velocity signals are fed through nuclear gauge electronic circuitry 18 and a differential pressure transmitter 20, respectively, to a console 22 having windows through which appear digital indications of slurry velocity, specific gravity, production rate and total production, all as described in the aforementioned patent to Turner et al. to which reference is made for a more complete description of the console.

Connected to the console 22 by electrical leads 24, 26 is a receiver comprising a remote display module 28 embodying the present invention. The leads 24, 26 transmit to the module or receiver 28 signals representative of the values of the sensed specific gravity and velocity of the slurry.

Figure 2:
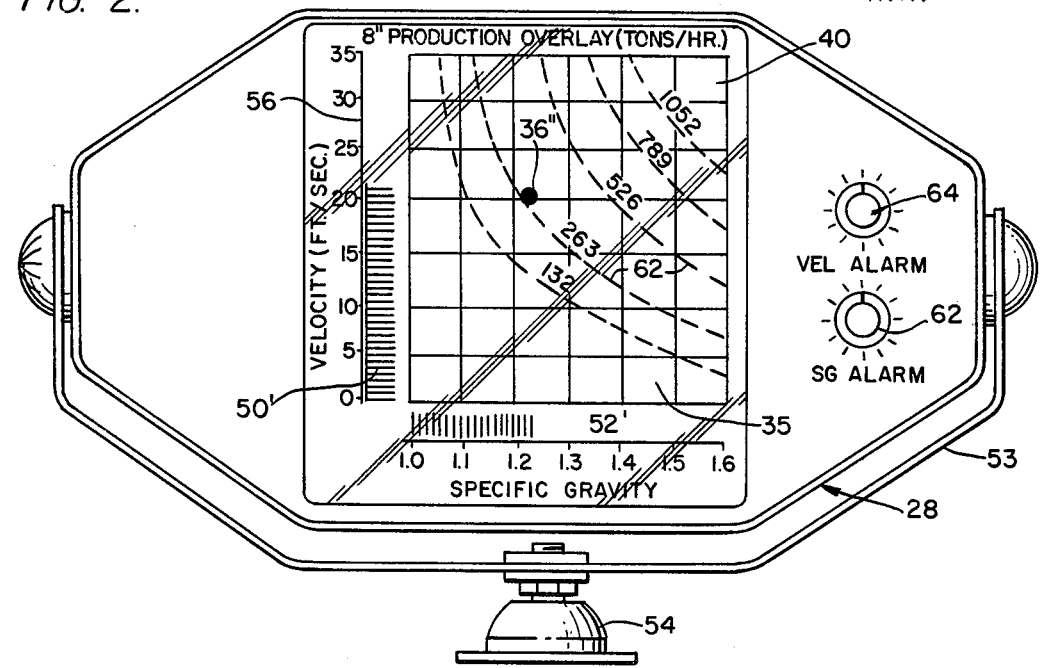
FIG. 2 is an enlarged front elevational view of a concept for the remote display module of the present invention.

With reference now to FIG. 4 it will be observed that the respective "VEL" and "SG" signals are fed into respective integrated circuits 31, 33 within the remote display module, each circuit having a plurality of outlets 29, 30, respectively, connected to respective sets of conductors 32, 34 which in turn connect light emitting elements 36 in rows and columns in a two dimensional matrix on the display face 35 of the module 28 in FIG. 2.

The integrated circuits 31, 33 of FIG. 4 generate signals that are fed to one output of each circuit, say, to outputs 29, 30, in response to the value of the particular "SG" or "VEL" signal to energize one each of a row and column of light emitting elements, whereby that element, say element 36', at the intersection of the respective energized row and column indicated by the dashed lines 32', 34' is energized to cast a spot of light 36" (see FIG. 2) on the display face 35 of the module 28.

The "VEL" and "SG" signals derived from the console 22 are also fed to other integrated circuits 42, 44, having a plurality of outlets 46, 48, respectively, which are connected to corresponding sets of light emitting elements 50, 52, the arrangement of the circuits being such that, instead of just energizing one outlet each corresponding to the values of the "VEL" and "SG" signals, they also energize all outlets extending from a datum position, say a zero position, along lines corresponding to ordinate and abscissa lines so that all light emitters from the zero position to that corresponding the values of the signals are energized to provide bars of light at the sides of the matrix of rows and columns of light emitting elements, these bars having lengths equal in length to the coordinate position of the one light emitting element 36' energized in the matrix. The latter is shown black in FIG. 4 as are all the energized elements in each bar light.

With reference now to FIG. 2, a dredge operator, say, having before him the module 28 will see on the display face of the module the spot of light 36" mentioned above, and two bars of light 50', 52' which desirably have next to them on the display face scales 56, 58 calibrated in values of slurry velocity and specific gravity, respectively.

Desirably the module 28 is adjustably mounted on a frame 53 adjustably carried on a standard 54 for mounting in a position easily viewed by the operator.

Figure 3:
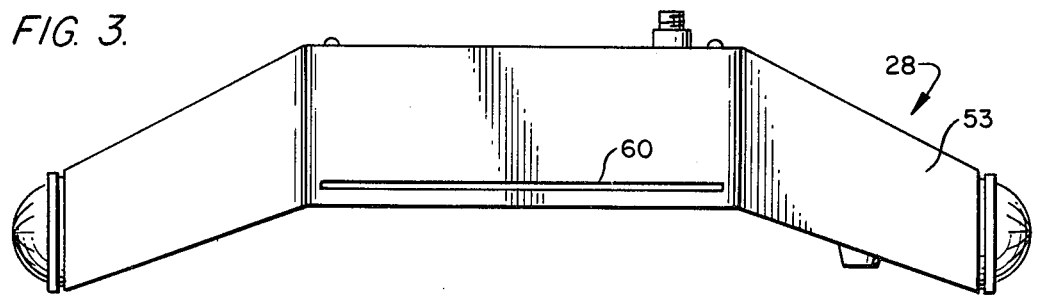
FIG. 3 is a plan view of the module of FIG. 2.

The invention comtemplates that superimposed on or over the display face is a graphical indicia representative of specific gravity and velocity of the slurry. This may be done by way of an overlay which is inserted into the front of the module through a slot 60 in the upper wall thereof as shown in FIG. 3. The indicia may simply be a grid of spaced ordinate and abscissa lines corresponding to the calibrations 56, 58 or the overlay may desirably include a family of curves 62 suited to a pipeline of known diameter in which the slurry flows. The curves may be derived mathematically, or on test facilities employing elbow measuring means with each curve being representative of a given weight of solids pumped per unit of time, e.g. tons per hour, for a pipe line of known diameter. The line marked "132", for example, means that approximately 132 tons per hour of solids will be pumped for specific gravities and velocities which lie on that line. Obviously, the higher the specific gravity and the higher the velocity, the more solids that can theoretically be pumped. However, the pumping apparatus may be incapable of sustaining a high volume and thus over-all efficiency may demand that a lower rate be maintained, as, for example, along the lines marked "263" tons per hour. If this were the established optimum, then the operator would control the dredge or whatever, to maintain the light spot 36" as close as possible to the "263" curve at an intermediate range of velocity and specific gravity.

In order to provide an indication of excessive velocity or specific gravity or both, variable alarm switches and signals may be provided as shown at 64, 66, in FIGS. 2 and 4, the arrangement being such that upper limits of velocity and specific gravity may be preset and, when exceeded, the alarm signal, audibly or visually, that one or the other of the preset values has been exceeded.

Described and shown is a matrix of light emitting diodes which are used in conjunction with overlays. It is within the purview of the invention that instead of the matrix shown and described, a CRT could be used with a graphical image electronically superimposed on the display face of the CRT. Thus, the invention is susceptible of this and varity of other changes and modifications without, however, departing from the scope and spirit of the appended claims.

We claim:

1. Remote display module means for displaying a continuous indication of the specific gravity relative to velocity of a slurry of liquid and solids flowing in a pipeline of known diameter comprising receiver means having a display face, means for generating a first signal representative of the specific gravity of the slurry flowing in the pipeline and means for applying said signal to said receiver means so that the value of said signal lies along a first line from a datum position a distance proportinate to the value of said first signal, said first line corresponding to one of the abscissa and ordinate of a two dimensional graphical display, means for generating a second signal representative of the velocity of flow of slurry in the pipeline, and means for applying said signal to said receiver means so that the value of said signal lies along a second line from said datum position a distance proportinate to the value of said second signal, said second line corresponding to the other of said abscissa and ordinate, means for generating a spot of visible light on the face of said receiver means at a point where abscissa and ordinate lines corresponding to said signals would intersect, and graphical indicia superimposed on said display face representative of the specific gravity and velocity of said slurry, said indicia including graphical representation of the flow rate by quantity per unit of time of solids in a slurry flowing in a pipeline of known diameter, the position of said light spot relative to said graphical representation giving an instantaneous visible indication of the flow rate of the solids in the pipeline.

2. The remote display module means of claim 1 wherein said graphical indicia includes a grid of spaced ordinate and abscissa lines.

3. The remote display module means of claims 1 or 2 including a pair of bar light means extending from said datum position on said receiver means along lines corresponding to ordinate and abscissa lies respectively, and circuit means for energizing each of said bar light means to provide visible lines of light extending from said datum position a distance corresponding to the coordinate position of said spot of visible light on said display face to provide instantaneous separate displays of the values of specific gravity and velocity of the slurry flowing in said pipeline.

4. The remote display module means of claims 1 or 2 including alarm means and adjustable limit switches for setting said alarm means to signal an alarm when either the value of the specific gravity or the velocity or both, of the slurry flowing in the pipeline exceeds the limit determined by the setting of the adjustable limit switches.

5. The display means of claim 1 wherein said superimposing graphical indicia on said display face comprises a removable overlay through which said spot of light may be observed.

6. Remote display module means for displaying a continuous indication of the weight per unit of time of solids in a slurry of liquid and solids flowing in a pipeline of known diameter comprising receiver means having a display face, a two dimensional matrix of light emitting elements arranged in rows and columns on said display face, a plurality of first and second sets of conductors interconnecting said rows and columns of light emitting elements, a first signal generating circuit for generating signals related to the specific gravity of said slurry and having a plurality of output terminals for coupling said signals respectively with one of said sets of conductors for energizing a particular row or column responsive to the value of said specific gravity, second signal generating circuit for generation signals related to the velocity of said slurry flowing in the pipeline and having a plurality of output terminals for coupling said signals respectively with the other of said sets of conductors for energizing a particular row or column responsive to the value of said velocity, means on said receiver for supporting an overlay over said matrix, said overlay bearing indicia representing for said pipeline of known diameter the flow rate of solids by weight per unit of time for preselected ranges of slurry velocity and specific gravity, the light emitting element at the inersection of said particular energized row and column being energized to cast a spot of light visible on the side of said overlay opposite said matrix.

7. The display means of claim 6 wherein said display face includes a pair of bar lights extending at right angles adjacent the sides of said matrix, said first and second signals generating means including signals for energizing said bar lights along lengths corresponding to the coordinate position of the energized light emitting element to give instantaneous separate displays of the values of specific gravity and velocity of the slurry flowing in said pipeline.

8. The display means of claims 6 or 7 including alarm means and adjustable limit switches for setting said alarm means to signal an alarm when either the value of the specific gravity or the velocity or both, of the slurry flowing in the pipeline exceeds the limit determined by the setting of the adjustable limit switches.

* * * * *